(12) United States Patent
Sugano

(10) Patent No.: US 8,766,078 B2
(45) Date of Patent: Jul. 1, 2014

(54) MUSIC PIECE ORDER DETERMINATION DEVICE, MUSIC PIECE ORDER DETERMINATION METHOD, AND MUSIC PIECE ORDER DETERMINATION PROGRAM

(71) Applicant: JVC Kenwood Corporation, Yokohama (JP)

(72) Inventor: Masato Sugano, Yokosuka (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 0 days.

(21) Appl. No.: 13/911,222

(22) Filed: Jun. 6, 2013

(65) Prior Publication Data

US 2013/0263720 A1 Oct. 10, 2013

Related U.S. Application Data

(63) Continuation of application No. PCT/JP2011/077688, filed on Nov. 30, 2011.

(30) Foreign Application Priority Data

Dec. 7, 2010 (JP) .................................. 2010-272913

(51) Int. Cl.
*G10H 7/00* (2006.01)

(52) U.S. Cl.
USPC .......................................................... 84/612

(58) Field of Classification Search
USPC .................................................... 84/612, 636
See application file for complete search history.

(56) References Cited

U.S. PATENT DOCUMENTS

| 6,344,607 B2 * | 2/2002 | Cliff ................................ 84/611 |
| 6,605,770 B2 * | 8/2003 | Yamane et al. ................. 84/609 |
| 6,933,432 B2 * | 8/2005 | Shteyn et al. ................... 84/609 |
| 7,081,582 B2 * | 7/2006 | Basu ................................ 84/625 |
| 7,220,911 B2 * | 5/2007 | Basu ................................ 84/625 |
| 7,525,037 B2 * | 4/2009 | Hansson et al. ................. 84/615 |
| 7,592,534 B2 * | 9/2009 | Yoshikawa et al. ............. 84/612 |

(Continued)

FOREIGN PATENT DOCUMENTS

| JP | 2002-6839 A | 1/2002 |
| JP | 2006-293246 A | 10/2006 |
| JP | 2008-216486 A | 9/2008 |
| WO | 2007/066818 A1 | 6/2007 |

*Primary Examiner* — Jeffrey Donels
(74) *Attorney, Agent, or Firm* — Nath, Goldberg & Meyer; Jerald L. Meyer; Stanley N. Protigal

(57) ABSTRACT

A music piece order determination device includes a beat information corrector, a correlation value calculator, and a music piece order determiner. The beat information corrector acquires beat position information and a tempo value in a musical composition, and corrects the beat position information such that the tempo value becomes the same value as a reference value. The correlation value calculator calculates a correlation value indicative of a degree of correlation of beat position information between respective musical compositions among a plurality of musical compositions, based on the beat position information. The music piece order determiner determines a music piece order, which is a reproduction order of musical compositions, based on the correlation value between the respective musical compositions.

10 Claims, 4 Drawing Sheets

(56) References Cited

U.S. PATENT DOCUMENTS

| | | | |
|---|---|---|---|
| 7,615,702 B2* | 11/2009 | Becker et al. | 84/612 |
| 7,678,984 B1* | 3/2010 | Lamere | 84/615 |
| 8,269,093 B2* | 9/2012 | Naik et al. | 84/612 |
| 2001/0039872 A1* | 11/2001 | Cliff | 84/609 |
| 2006/0000344 A1* | 1/2006 | Basu | 84/612 |
| 2008/0121092 A1* | 5/2008 | Drel et al. | 84/612 |
| 2009/0272253 A1* | 11/2009 | Yamashita et al. | 84/611 |
| 2010/0162115 A1* | 6/2010 | Ringewald et al. | 715/716 |

* cited by examiner

MUSIC PIECE ORDER DETERMINATION DEVICE, MUSIC PIECE ORDER DETERMINATION METHOD, AND MUSIC PIECE ORDER DETERMINATION PROGRAM

CROSS REFERENCE TO RELATED APPLICATION

This application is a Continuation of PCT Application No. PCT/JP2011/077688, filed on Nov. 30, 2011, and claims the priority of Japanese Patent Application No. 2010-272913, filed on Dec. 7, 2010, the content of both of which is incorporated herein by reference.

BACKGROUND

The present invention relates to a music piece order determination device, a music piece order determination method, and a music piece order determination program, for determining a reproduction order of musical compositions.

As one of methods for expressing music, there is known a method called mix reproduction. Mix reproduction is a method for, instead of sequentially reproducing each music piece simply from the start to the end thereof, continuously reproducing successive musical compositions without a pause while adjusting the reproduction speed of music pieces, giving effects such as delay or reverb to the music pieces, or inserting sound effects such as scratch.

A patent document (International Publication WO 2007/066818) discloses the technique of automatically performing mix reproduction of musical compositions by selecting a mixing method appropriate to successive music pieces through the use of metadata in which beats and melody structures of the musical compositions are described.

However, there is a case where a feeling of unnaturalness is caused in connection between successive musical compositions when the successive musical compositions are not compatible with mix reproduction, even by performing mix reproduction through the use of the technique in the patent document. It was not possible for the technique in the patent document to determine a reproduction order of musical compositions (music piece order) suitable to mix reproduction in consideration of the compatibility between musical compositions.

SUMMARY

The present invention has been made in view of the above, and an object thereof is to provide a music piece order determination device, a music piece order determination method, and a music piece order determination program, capable of determining a music piece order suitable to mix reproduction.

According to a first aspect of the present invention, there is provided a music piece order determination device including: a beat information corrector configured to acquire beat position information which includes at least information on a time of reproducing a beat when a musical composition is reproduced, to acquire a tempo value which is indicative of the number of beats per unit time in a musical composition, and to correct, in the case where the tempo value is different from a reference value, the beat position information of the musical composition such that the tempo value of the musical composition becomes the same value as the reference value; a correlation value calculator configured to calculate a correlation value indicative of a degree of correlation of beat position information between respective musical compositions among a plurality of musical compositions, based on the beat position information having the tempo value which has been corrected to the same value as the reference value; and a music piece order determiner configured to determine a music piece order, which is a reproduction order of musical compositions, based on the correlation value between the respective musical compositions.

According to a second aspect of the present invention, there is provided a music piece order determination method including the steps of: acquiring beat position information which includes at least information on a time of reproducing a beat when a musical composition is reproduced, acquiring a tempo value which is indicative of the number of beats per unit time in the musical composition, and correcting, in the case where the tempo value is different from a reference value, the beat position information of the musical composition such that the tempo value of the musical composition becomes the same value as the reference value; calculating a correlation value indicative of a degree of correlation of beat position information between respective musical compositions among a plurality of musical compositions, based on the beat position information when the tempo value is the same value as the reference value; and determining a music piece order, which is a reproduction order of musical compositions, based on the correlation value between the respective musical compositions.

According to a third of the present invention, there is provided a music piece order determination program that causes a computer to execute the steps of: acquiring beat position information which includes at least information on a time when a beat is reproduced in the case where a musical composition is reproduced, acquiring a tempo value which is indicative of the number of beats per unit time in the musical composition, and correcting, in the case where the tempo value is different from a reference value, the beat position information of the musical composition such that the tempo value of the musical composition becomes the same value as the reference value; calculating a correlation value indicative of a degree of correlation of beat position information between respective musical compositions among a plurality of musical compositions, based on the beat position information when the tempo value is the same value as the reference value; and determining a music piece order, which is a reproduction order of musical compositions, based on the correlation value between the respective musical compositions.

According to the present invention, it is possible to determine a music piece order suitable to mix reproduction.

DETAILED DESCRIPTION

Hereinafter, there will be described an embodiment of a music piece order determination device according to the present invention with reference to a block diagram of FIG. 1.

Figure 1:
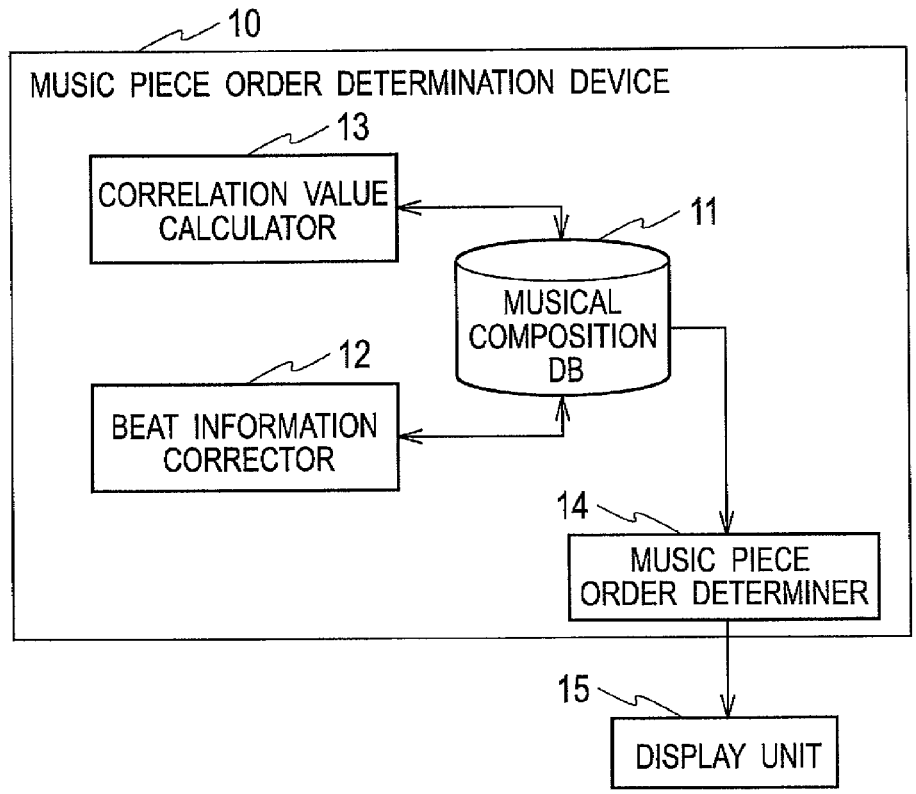
FIG. 1 is a block diagram that illustrates a configuration example of a music piece order determination device according to an embodiment of the present invention.

FIG. 1 is a block diagram that illustrates a configuration example of the embodiment of the music piece order determination device according to the present invention.

As shown in FIG. 1, the music piece order determination device 10 includes a musical composition DB (database) 11, a beat information corrector 12, a correlation value calculator 13, and a music piece order determiner 14. The music piece order determination device 10 is connected to a display unit 15.

The musical composition DB 11 stores musical composition data of a plurality of musical compositions, beat information metadata being metadata of each musical composition, a correlation value table (see FIG. 5 to be described later) storing correlation values between musical compositions in the form of a table, and the like. The musical composition DB 11 includes a storage device such as an HDD or a memory. Note that the musical composition DB 11 may be a fixed storage device, an attachable/detachable storage device, or an external storage device connected through a cable or a network.

Beat information metadata includes beat position information including information on the position of a beat on the time axis of a musical composition and information on the amplitude of a beat, and a tempo value indicative of a tempo of the musical composition. The tempo value is represented by, for example, a BPM (Beat Per Minute). The BPM is a value indicative of the number of beats (in general, the number of quarter notes) per minute (unit time) of a musical composition. Note that in the beat position information, information on the amplitude of a beat may not necessarily be included, and for example, all the amplitudes may have the same value (for example, 1). However, by inclusion of information on the amplitude of a beat in the beat position information, when calculating a correlation value to be described later in detail, it is possible to more accurately calculate the correlation value.

Furthermore, the position of a beat on the time axis is information indicative of the time when the beat is reproduced at the time of reproduction of a musical composition, and for example, on the basis of the reproduction start time when the musical composition data is reproduced from the start thereof, the position is indicated by the time elapsed from the reproduction start time. Note that the beat position information is not necessarily required to be based on the reproduction start time and may also be based on an arbitrary time when the musical composition is reproduced.

Figure 2:
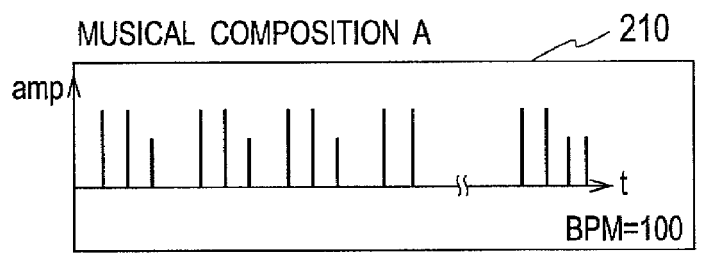
FIG. 2 is a diagram that illustrates beat information metadata according to the embodiment of the present invention.
Figure 2:
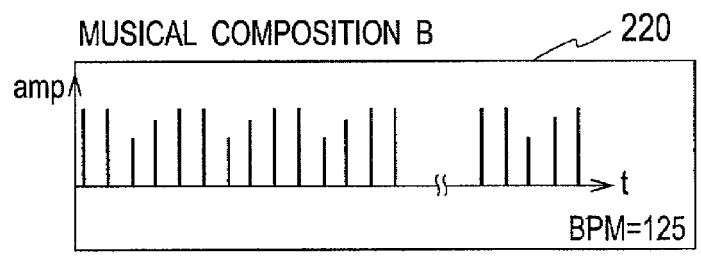

FIG. 2 is a diagram that illustrates beat information metadata, and FIGS. 2(a) and 2(b) are respectively diagrams for explaining beat information metadata 210 and 220 of musical compositions A and B.

In FIG. 2, the horizontal axis represents a time t and the vertical axis represents an amplitude amp of a beat. The beat position on the time axis is a position where the sound of percussion instruments (sound that determines the rhythm of a music piece) composing each musical composition is produced. The kinds of percussion instruments do not matter. In addition, in the case of a musical composition including no percussion instrument sound, the beat position represents a position where the sound of a musical instrument forming a beat is produced. Note that, in the case of the beat information metadata 210 of the musical composition A shown in FIG. 2(a), BPM=100 holds. Also, in the case of the beat information metadata 220 of the musical composition B shown in FIG. 2(b), BPM=125 holds.

In the present embodiment, the beat position information on the time axis of each musical composition and the BPM are stored in the musical composition DB 11 as beat information metadata, but the method for acquiring beat information metadata is not limited to this, and for example, a user may, in advance, input beat position information and the BPM. Furthermore, beat information metadata may be automatically detected from the waveform of a musical composition and maybe used as beat information metadata, through the use of the beat detection method or the like described in Japanese Patent Application Laid-Open Publication No. 2008-233812, etc.

The beat information corrector 12 acquires beat information metadata of each musical composition from the musical composition DB 11, corrects the beat position in the beat position information of a musical composition whose BPM is different from the reference BPM, which is a predetermined reference value, and thus causes the BPM of each musical composition to coincide with the reference BPM (to uniform the BPMs). The beat information corrector 12 stores the corrected beat position information and BPM in the musical composition DB 11. Note that the operation of the beat information corrector 12 will be described later in detail. Meanwhile, the reference BPM may be determined in advance or the BPM of a predetermined musical composition may be used as the reference BPM.

The correlation value calculator 13 calculates a correlation value indicative of a degree of correlation of beat position information between each musical composition of a plurality of musical compositions stored in the musical composition DB 11 on the basis of the beat position information of each musical composition whose BPM has been uniformed. Note that, as an example, in the present embodiment, it is assumed that the larger the correlation value is, the higher the correlation is. The correlation value calculator 13 stores the calculated correlation value in the musical composition DB 11 etc. as beat information metadata of each musical composition. In the present embodiment, the correlation value calculator 13 further normalizes the correlation value of each musical composition stored in the musical composition DB 11 or the like and stores the normalized value as a correlation value table, in the musical composition DB 11. Note that the processing of normalizing the correlation value is not indispensable in the present invention.

The music piece order determiner 14 acquires the normalized correlation value from the correlation value table stored in the musical composition DB 11 and determines a music piece order, which is a reproduction order of a predetermined number of musical compositions to be reproduced from the musical composition DB 11, on the basis of the normalized correlation value.

The display unit 15 is a display or a monitor and displays a music piece order determined by the music piece order determiner 14.

(Description of Operation of the Present Device)

Next, there will be described the operation of the music piece order determination device 10 of the present embodiment with reference to a flowchart or the like. First, there will be described examples of the operation of beat information correction by the beat information corrector 12 and the operation of correlation value calculation by the correlation value calculator 13 of the music piece order determination device 10. Note that, here, there will be described a case where a value indicative of a degree of correlation of beat position information at the ending part of a musical composition and the beginning part of a musical composition between the respective musical compositions is set to be a correlation value between each musical composition.

(Operations of Beat Information Correction and Correlation Value Calculation)

Figure 3:
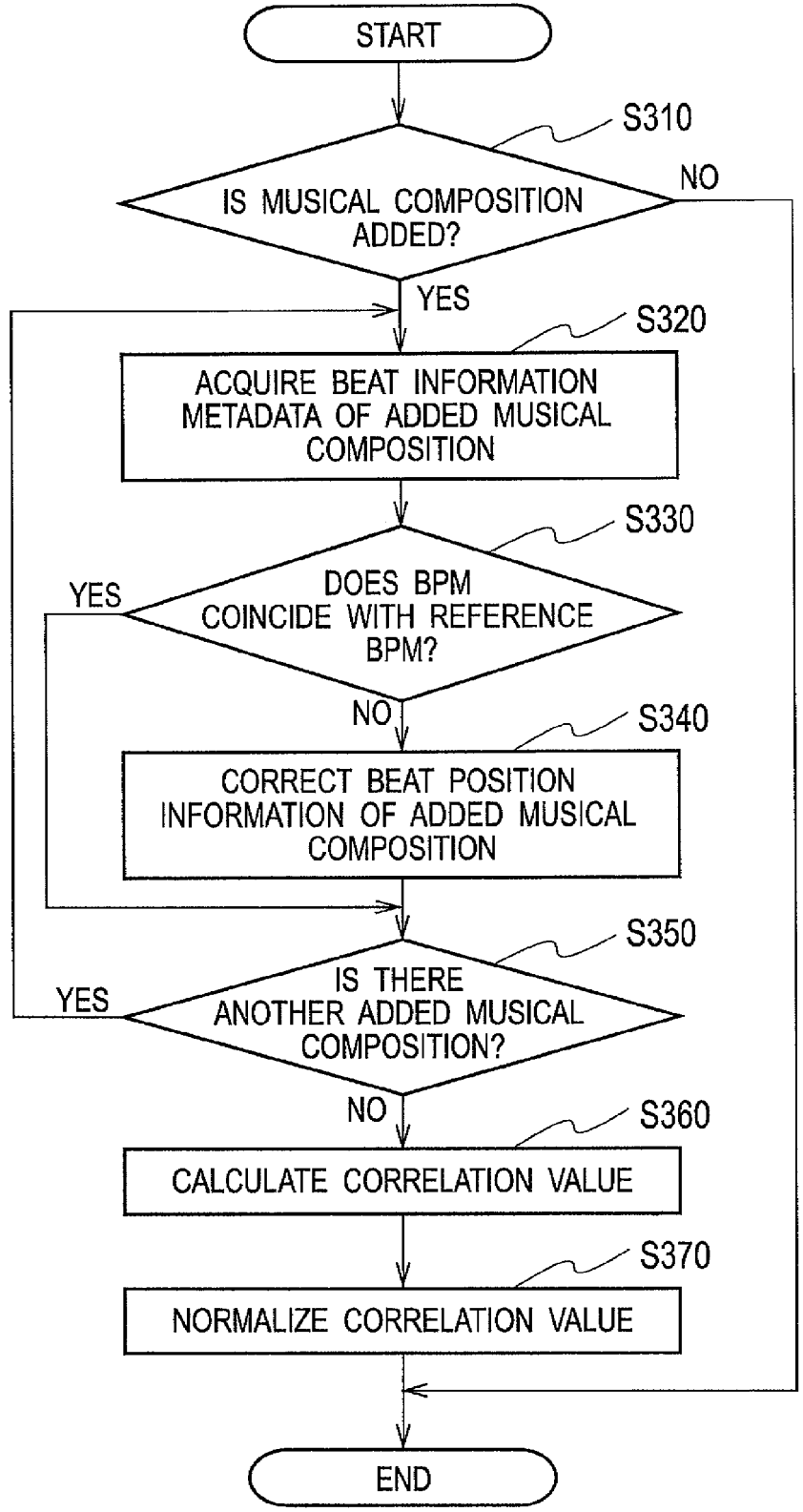
FIG. 3 is a flowchart that illustrates an example of operations of a beat information corrector and a correlation value calculator according to the embodiment of the present invention.

FIG. 3 is a flowchart that illustrates an example of the operations of the beat information corrector 12 and the correlation value calculator 13.

In the music piece order determination device 10, for example, every time a musical composition is added to the musical composition DB 11, correction of beat position information and BPM, calculation of a correlation value, and normalization processing are performed.

That is, in the music piece order determination device 10, first, the beat information corrector 12 determines whether or not a musical composition is newly added to the musical composition DB 11 (step S310) and if a musical composition is not newly added ("No" at step S310), the processing is exited.

In the case where a new musical composition is added to the musical composition DB 11 ("Yes" at step S310), the beat information corrector 12 acquires beat information metadata of the added musical composition from the musical composition DB 11 (step S320).

Next, the beat information corrector 12 determines whether or not the BPM of the added musical composition included in the acquired beat information metadata coincides with the reference BPM (step S330). In the case where they coincide with each other ("Yes" at step S330), the procedure proceeds to step S350. In the case where they do not coincide with each other ("No" at step S330), the beat information corrector 12 corrects the beat position in the beat position information of the added musical composition, to thereby cause the BPM to coincide with the reference BPM. The beat information corrector 12 stores the corrected beat position information and BPM, in the musical composition DB 11 (step S340). Subsequent to step S340, the beat information corrector 12 proceeds to step S350.

(Correction of Beat Position Information)

Here, there will be described a specific example of the correction method of beat position information at step S340 in FIG. 3.

In the case where mix reproduction of two musical compositions is performed, in many cases, the values of BPM information of the two musical compositions are matched with each other for reproduction so that their beats can be heard in harmony with each other. Because of this, in the present embodiment, the BPM of each musical composition is matched with the reference BPM before the correlation value is obtained.

That is, in the case where a musical composition is added to the musical composition DB 11, before calculating correlation values between the beat position information of the added musical composition and the beat position information of all the other musical compositions stored in the musical composition DB 11, the beat information corrector 12 provides a reference BPM serving as the BPM of each musical composition, and corrects the beat position so that the BPMs of all the musical compositions are matched with the reference BPM. Here, the reference BPM is a BPM used for the purpose of calculating a correlation value and it is not always necessary to use the reference BPM at the time of reproduction.

Specifically, in the case where the reference BPM is set to be "Tb" and the BPM of a musical composition to be corrected to be "T", the beat information corrector 12 causes the BPM of the musical composition to coincide with the reference BPM, by extending, to T/Tb times the original BPM, the beat interval in time series of the musical composition to be corrected.

Figure 4:
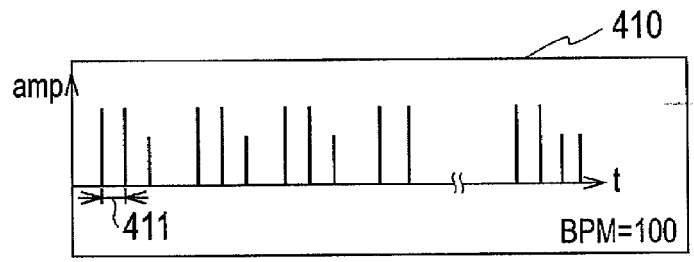
FIG. 4 is a diagram that illustrates a beat position information correction method by the beat information corrector according to the embodiment of the present invention.

FIG. 4 is a diagram that illustrates the correction method of beat position information by the beat information corrector.

For example, it is assumed that beat information metadata 410 shown in FIG. 4(a) is the beat information metadata of the added musical composition. The BPM in the beat information metadata 410 is 100. In contrast to this, in the case where the reference BPM is 80, the beat information corrector 12 corrects the beat position so that the beat interval in the beat information metadata 410 in FIG. 4(a) is extended to a beat interval 5/4 (=100/80) times the original beat interval. FIG. 4(b) shows beat information metadata 420 after the correction. For example, the beat information corrector 12 extends the beat interval by inserting "0" into a beat interval 411 in FIG. 4(a). Due to this, a beat interval 421 in FIG. 4(b) corresponding to the beat interval 411 in FIG. 4(a) becomes 5/4 times the beat interval 411. The BPM in the beat information metadata 420 becomes the reference BPM that is 80.

Returning to FIG. 3, at step S350, the beat information corrector 12 determines whether or not there is another added musical composition. In the case where the beat information corrector 12 determines that there is another added musical composition ("Yes" at step S350), the procedure returns to the processing at step S320. In the case where the beat information corrector 12 determines that there is no added musical composition ("No" at step S350), the procedure proceeds to the processing at the next step S360.

At step S360, the correlation value calculator 13 calculates correlation values between the beat position information at the ending part of the added musical composition and the beat position information at the beginning parts of the musical compositions other than the added musical composition. The correlation value calculator 13 stores the calculated correlation values as the beat information metadata of the added musical composition A, in the musical composition DB 11. Furthermore, the correlation value calculator 13 also calculates correlation values between the beat position information at the beginning part of the added musical composition and the beat position information at the ending parts of the musical compositions other than the added musical composition, and stores the calculated correlation values as the beat information metadata of the musical compositions other than the added musical composition, respectively, in the musical composition DB 11. Meanwhile, the processing at this step S360 will be explained again in FIG. 5.

At the next step S370, the correlation value calculator 13 reads the correlation values stored as the beat information metadata of each musical composition from the musical composition DB 11, and normalizes the correlation values so that the sum of the correlation value of the added musical composition and those of the musical compositions other than the added musical composition becomes 1. The correlation value calculator 13 stores the normalized correlation values as a correlation value table as shown in FIG. 5, in the musical composition DB 11.

Figure 5:
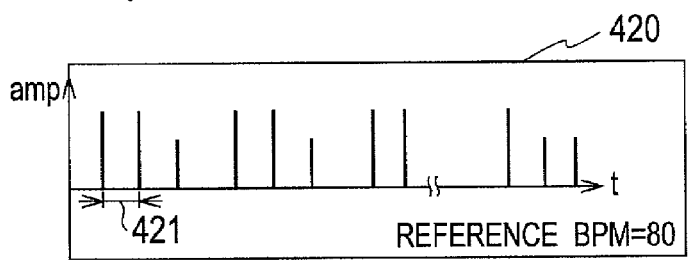
FIG. 5 is a diagram that illustrates an example of a correlation value table according to the embodiment of the present invention.

FIG. 5 is a diagram that illustrates an example of a correlation value table stored in the musical composition DB 11.

In a correlation value table 500 shown in FIG. 5, correlation values in the case where each of musical compositions A to E is used as the previous music piece and the next music piece are normalized and stored so that the sum of correlation values in each column becomes 1. That is, in the correlation value table 500 shown in FIG. 5, the sum of the musical compositions A to E in each column is 1, and thus it is possible to use the correlation value of a music piece as a transition probability to the musical compositions other than an own music piece.

Here, for example, in the correlation value table 500 shown in FIG. 5, in the case where the musical composition E is the added musical composition, the other musical compositions are the musical compositions A to D. In this case, at step S360, first, the correlation value calculator 13 acquires correlation values in the case where the musical composition E is the previous music piece and the musical compositions A to D are the next music pieces, that is, correlation values between the beat position information at the ending part of the musical composition E and the beat position information at the beginning parts of the other musical compositions A to D. That is, the correlation value calculator 13 calculates values before the normalized values 0.40, 0.12, 0.33, and 0.15 are obtained as shown in the correlation value table 500 shown in FIG. 5, as correlation values respectively in the case where the musical composition E is set to be the previous music piece and the other musical compositions A to D are set to be the next music pieces, and stores the calculated values in the musical composition DB 11 as the beat information metadata of the musical composition E.

In addition to this, at step S360, the correlation value calculator 13 further acquires correlation values in the case where the musical compositions A to D are the previous music pieces and the musical composition E is the next music piece, that is, correlation values between the beat position information at the beginning part of the musical composition E and the beat position information at the ending parts of the other musical compositions A to D. That is, the correlation value calculator 13 calculates correlation values before the normalized values 0.37, 0.08, 0.12, and 0.39 are obtained as shown in the correlation value table 500 shown in FIG. 5, as correlation values between the beat position information at the beginning part of the musical composition E and the beat position information at the ending parts of the other musical compositions A to D, respectively, and stores the calculated values as the beat information metadata of the musical compositions A to D, in the musical composition DB 11.

As described above, at step S360, the correlation value calculator 13 calculates correlation values every time a musical composition is newly added and stores the calculated values as beat information metadata in the musical composition DB 11, and thus at step S370, every time a musical composition is newly added, the correlation value calculator 13 performs normalization again in combination of the correlation values newly calculated at step S360 with the existing correlation values, and stores the normalized values as the correlation value table 500, and exits the flowchart. For example, in the case where a musical composition F is newly added, the correlation value calculator 13 performs normalization again in the correlation value table 500 shown in FIG. 5 so that the sum of each column of the musical compositions A to F, which is each column of the musical compositions A to E to which the new musical composition F is added, becomes 1, and stores the normalized values as the correlation value table 500. Note that, here, the correlation value calculator 13 stores only the normalized correlation values as the correlation value table 500, but it may also be possible to store the correlation values before normalization as another correlation value table.

(Calculation of Correlation Value)

Next, there will be described the correlation value calculation method by the correlation value calculator 13 at step S360.

Figure 6:
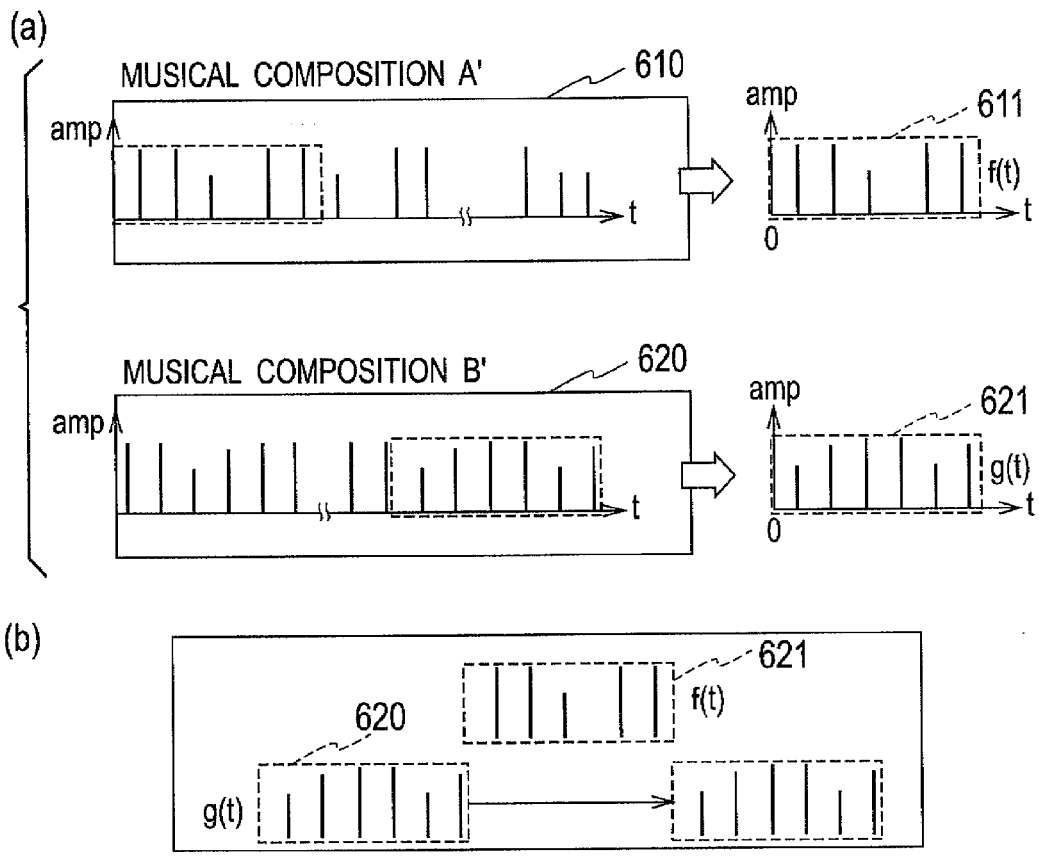
FIG. 6 is a diagram that illustrates a correlation value calculation method according to the embodiment of the present invention.

FIG. 6 is a diagram that illustrates the correlation value calculation method in the correlation value calculator 13.

Beat position information 610 of a musical composition A' and beat position information 620 of a musical composition B' shown in FIG. 6(*a*) are beat position information after each BPM is caused to coincide with the reference BPM. There will be described a case, as an example, where a degree of correlation between beat position information 611 at the beginning part of the musical composition A' and beat position information 621 at the ending part of the musical composition B' is calculated.

First, as shown in FIG. 6(*a*), the correlation value calculator 13 sets, to be a function f(t), the beat position information 611 at the beginning part extracted from the beat position information 610 of the musical composition A'. Similarly, the correlation value calculator 13 sets, to be a function g(t), the beat position information 621 at the ending part of the musical composition B' extracted from the beat position information 620 of the musical composition B'.

Note that it may also be possible to determine the range of the beat position information to be extracted by a fixed time length from the beginning or ending of the musical composition, or from a position where a beat exists, or it may also be possible to obtain the range as a ratio from the time length of the musical composition. For example, in the latter case, if 5% of the whole of the musical composition is extracted, from the musical composition having a time length of five minutes, 15 seconds are extracted.

Next, as shown in FIG. 6(*b*), the correlation value calculator 13 obtains the total sum of the product of f(t) and g(t), that is, $\Sigma n(f(n) \cdot g(n-m))$, at each parallelly-translated position (time) while parallelly translating, in a time axis direction, the function g(t) indicating the beat position information 621 at the ending part of the musical composition B'.

That is, the correlation value calculator 13 changes m in the range in which f(t) and g(t) overlap with each other and obtains $\Sigma n(f(n) \cdot g(n-m))$ at each value of m, and sets, to be a correlation value, the maximum value of the total sum $\Sigma n(f(n) \cdot g(n-m))$ of the product of f(t) and g(t) thus obtained.

Therefore, for example, the correlation value calculator 13 stores, as an array at each arbitrary time interval, the function f(t) indicating the beat position information 611 at the beginning part of the musical composition A' and the function g(t) indicating the beat position information 621 at the ending part of the musical composition B'. That is, in the array element corresponding to the time at which a beat exists, the value (amplitude) of the beat is arranged, and in the array element corresponding to the time at which no beat exists, 0 is arranged.

Therefore, $\Sigma n(f(n) \cdot g(n-m))$, which is the total sum of the product of f(t) and g(t) when m is varied in the range where f(t) and g(t) overlap, becomes the total sum of the product of each corresponding element of the array corresponding to f(t) and g(t). Here, acquiring the total sum of the product while varying m in the range where f(t) and g(t) overlap is equivalent to acquiring the total sum of the product of the shifted array element, which is obtained by shifting an array element by an amount corresponding to m array elements in the range where the arrays overlap, and the corresponding array element of the other array. As described above, the correlation value calculator 13 calculates the maximum value of each total sum $\Sigma n(f(n) \cdot g(n-m))$ acquired by shifting m in the range where f(t) and g(t) overlap as a correlation value.

(Music Piece Order Determination Method Based on Correlation Value)

Next, there will be described the music piece order determination method by the music piece order determiner 14.

The music piece order determiner 14 determines a music piece order for a predetermined number of musical compositions to be reproduced from the musical composition DB 11 so that the product or the total sum of correlation values between musical compositions to be successively reproduced becomes a maximum value. For example, the music piece order determiner 14 selects a predetermined number of musical compositions from the musical composition DB 11 by user's specification or randomly, and determines a music piece order of selected musical compositions so that the product or the total sum of correlation values between musical compositions to be successively reproduced becomes a maximum value.

As described above, by determining a music piece order so that the product or the total sum of correlation values becomes a maximum value, it is possible to accurately determine an optimum music piece order. However, this method requires a large amount of calculation and requires a long period of time for calculation processing with a currently existing computer. When the number of musical compositions for which a music piece order is determined is set to be n, the number of musical composition transition patterns is nPn, and thus, in order to obtain a musical composition transition pattern with which the product or the total sum of correlation values becomes a maximum value, the amount of calculation in the order of n! is required.

Figure 7:
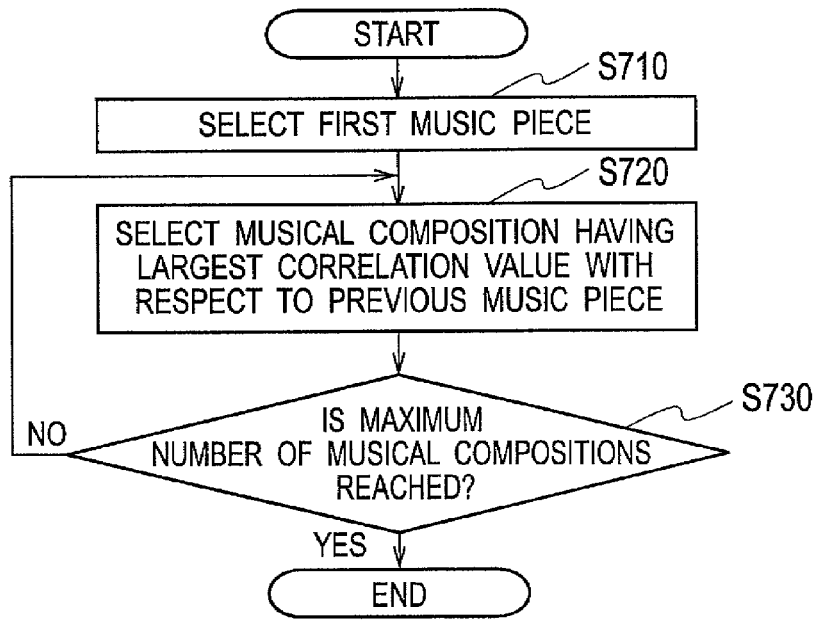
FIG. 7 is a flowchart that illustrates an example of an operation of a music piece order determiner according to the embodiment of the present invention.

Accordingly, hereinafter, there will be described a music piece order determination method with a small amount of calculation. FIG. 7 is a flowchart showing this music piece order determination method.

Here, there will be described, as an example, a case of determining a music piece order of the five music pieces, which are the musical compositions A to E shown in the correlation value table 500 in FIG. 5.

First, the music piece order determiner 14 selects a musical composition that is the first music piece (step S710). The music piece order determiner 14 may select the first music piece in accordance with user's specification or randomly. Here, it is assumed that the musical composition D is selected as the first music piece.

Next, the music piece order determiner 14 selects a musical composition having the largest correlation value with respect to the musical composition selected previously (step S720). In the case where the first music piece is the musical composition D, the music piece order determiner 14 selects, as the next music piece, the musical composition E having the largest correlation value of 0.39 with respect to the musical composition D.

Then, the music piece order determiner 14 determines whether or not the number of musical compositions selected hitherto has reached the maximum number of musical compositions (step S730). When the number of musical compositions selected hitherto has reached the maximum number of musical compositions ("Yes" at step S730), the music piece order determiner 14 exits the music piece order determination processing. Here, the maximum number of musical compositions is the number of musical compositions for which a music piece order is to be determined, and when determining a music piece order of five music pieces, the maximum number of musical compositions is five.

When the number of musical compositions selected hitherto has not yet reached the maximum number of musical compositions ("No" at step S730), the music piece order determiner 14 returns to step S720 and selects a musical composition again.

Note that, in this example, the musical composition E is selected as the second music piece, and thus, as the third music piece, there is selected the musical composition A having the largest correlation value of 0.40 with respect to the musical composition E. As the fourth music piece, there is selected the musical composition B having the third largest correlation value of 0.23 with respect to the musical composition A because the musical composition E having the largest correlation value of 0.37 with respect to the musical composition A and the musical composition D having the second largest correlation value of 0.28 with respect to the musical composition A have already been selected. In addition, the fifth music piece, which is the last music piece, serves as the remaining musical composition C.

By the series of pieces of processing of the flowchart in FIG. 7 as described above, the music piece order determiner 14 determines a music piece order by sequentially selecting a musical composition having the largest correlation value with respect to the previous music piece, until the number of selected musical compositions reaches a predetermined number (the maximum number of musical compositions) while selecting the first music piece and then the second and subsequent music pieces so that the same music piece is not selected repeatedly. Due to this, it is possible to determine a music piece order both simply and quickly and to prevent the same music piece from being selected a plurality of times.

Note that, in the present embodiment, there has been described the case where the value indicative of the degree of correlation of beat position information at the ending part of a musical composition and the beginning part of a musical composition among the respective musical compositions is set to be a correlation value between musical compositions, but the correlation value is not limited to this. Among the respective musical compositions, a value indicative of a degree of correlation of beat position information of at least part of each musical composition may be set to be a correlation value. For example, a value indicative of a degree of correlation of beat position information of the whole of a musical composition among the respective musical compositions may also be set to be a correlation value. In this case, the correlation value is the same value regardless of the order of the two music pieces.

As described above, the music piece order determination device 10 of the present embodiment can determine a music piece order suitable for mix reproduction by determining a music piece order through the use of the correlation value of beat position information of each musical composition whose BPM has been made uniform.

Furthermore, by using a value indicative of a degree of correlation of beat position information at the ending part of a musical composition and the beginning part of a musical composition among the respective musical composition as a correlation value, it is possible to effectively alleviate a feeling of difference at the connection part of musical compositions. Accordingly, it is possible to determine a music piece order suitable for mix reproduction even in the case where, for example, the compatibility between the ending part of the previous music piece and the beginning part of the next music piece does not agree with the degree of similarity of the music pieces themselves such as the fact that the beginning part of the music piece has a feeling of tranquility, but the musical composition is rhythmic as a whole.

Note that, in the present embodiment, description is given on the assumption that only one reference BPM exists, but a plurality of reference BPMs may be provided. When performing mix reproduction of two musical compositions, there is sometimes a case where the BPM of the subsequent musical composition is made to be one n-th of or n times the BPM of the previous musical composition. For example, there is included a case where when performing mix reproduction of a musical composition having a BPM of 70 after another musical composition having a BPM of 120, the BPM of the subsequent musical composition is made to be 60, which is ½ of the BPM of the previous musical composition, for reproduction. In consideration of such a case, the beat information corrector 12 may use, as the reference BPM, a value 1/n of the reference BPM or a value n times the reference BPM, in addition to the fundamental reference BPM. In the case where a plurality of reference BPMs is set as described above, the beat information corrector 12 generates beat position information whose beat position has been corrected in accordance with each of the plurality of reference BPMs for each musical composition. In the case where the beat information corrector 12 uses a plurality of reference BPMs, the correlation value calculator 13 calculates correlation values by using the corrected beat position information in accordance with each of the reference BPMs.

In the present embodiment, description has been given on the assumption that the music piece order determination device 10 has a hardware configuration as shown in FIG. 1, but the present invention is not limited to this, and the music piece order determination device 10 may have a software configuration including a CPU and a music piece order determination program that is programmed so as to cause the CPU to execute the function of the music piece order determination device 10.

What is claimed is:

1. A music piece order determination device comprising:
 a beat information corrector configured to acquire beat position information which includes at least information on a time of reproducing a beat when a musical composition is reproduced, to acquire a tempo value which is indicative of the number of beats per unit time in a musical composition, and to correct, in the case where the tempo value is different from a reference value, the beat position information of the musical composition such that the tempo value of the musical composition becomes the same value as the reference value;
 a correlation value calculator configured to calculate a correlation value indicative of a degree of correlation of beat position information between respective musical compositions among a plurality of musical compositions, based on the beat position information having the tempo value which has been corrected to the same value as the reference value; and
 a music piece order determiner configured to determine a music piece order, which is a reproduction order of musical compositions, based on the correlation value between the respective musical compositions.

2. The music piece order determination device according to claim 1, wherein the correlation value calculator calculates, as the correlation value between the respective musical compositions, a value indicative of a degree of correlation of beat position information at an ending part of one musical composition and beat position information at a beginning part of the other musical composition.

3. The music piece order determination device according to claim 1, wherein the music piece order determiner determines the music piece order of musical compositions such that the product or total sum of the correlation values among musical compositions to be successively reproduced becomes a maximum value.

4. The music piece order determination device according to claim 1, wherein the music piece order determiner determines the music piece order by sequentially selecting a musical composition having the largest correlation value with respect to the previous music piece while selecting a first music piece from among the plurality of musical compositions and then selecting second and subsequent music pieces such that the same music piece is not selected repeatedly.

5. A music piece order determination method comprising the steps of:
 acquiring beat position information which includes at least information on a time of reproducing a beat when a musical composition is reproduced, acquiring a tempo value which is indicative of the number of beats per unit time in the musical composition, and correcting, in the case where the tempo value is different from a reference value, the beat position information of the musical composition such that the tempo value of the musical composition becomes the same value as the reference value;
 calculating using a processor to calculate a correlation value indicative of a degree of correlation of beat position information between respective musical compositions among a plurality of musical compositions, based on the beat position information when the tempo value is the same value as the reference value; and
 determining using the processor to determine a music piece order, which is a reproduction order of musical compositions, based on the correlation value between the respective musical compositions.

6. A non-transitory computer user medium having a computer readable music piece order determination program embodied therein, the computer readable music piece order determination program comprising:
 acquiring a first music piece order determination program code for causing a computer to acquire beat position information which includes at least information on a time when a beat is reproduced in the case where a musical composition is reproduced, acquiring a tempo value which is indicative of the number of beats per unit time in the musical composition, and to correct, in the case where the tempo value is different from a reference value, the beat position information of the musical composition such that the tempo value of the musical composition becomes the same value as the reference value;
 calculating a second music piece order determination program code for causing the computer to calculate a correlation value indicative of a degree of correlation of beat position information between respective musical compositions among a plurality of musical compositions, based on the beat position information when the tempo value is the same value as the reference value; and
 determining a third music piece order determination program code for causing the computer to determine a music piece order, which is a reproduction order of musical compositions, based on the correlation value between the respective musical compositions.

7. The music piece order determination device according to claim 1, wherein the reference value includes a plurality of values.

8. The music piece order determination device according to claim 7, wherein the reference value includes a first reference value and a second reference value which is a value n times the first reference value, and the beat information corrector generates first beat position information by correcting the beat position information of the musical composition such that the tempo value becomes the same value as the first reference value, and generates second beat position information by correcting the beat position information of the musical composition such that the tempo value becomes the same value as the second reference value.

9. The music piece order determination device according to claim 7, wherein the reference value includes a first reference value and a third reference value which is 1/n times the first reference value, and the beat information corrector generates first beat position information by correcting the beat position information of the musical composition such that the tempo value becomes the same value as the first reference value, and generates third beat position information by correcting the beat position information of the musical composition such that the tempo value becomes the same value as the third reference value.

10. The music piece order determination device according to claim 7, wherein the reference value includes a first reference value, a second reference value which is a value n times the first reference value, and a third reference value which is a value 1/n times the first reference value, and the beat information corrector generates first beat position information by correcting the beat position information of the musical composition such that the tempo value becomes the same value as the first reference value, generates second beat position information by correcting the beat position information of the musical composition such that the tempo value becomes the same value as the second reference value, and generates third beat position information by correcting the beat position information of the musical composition such that the tempo value becomes the same value as the third reference value.

* * * * *